(12) United States Patent
Nakagawa et al.

(10) Patent No.: US 8,863,254 B2
(45) Date of Patent: Oct. 14, 2014

(54) AUTHENTICATION INFORMATION MANAGEMENT OF ASSOCIATED FIRST AND SECOND AUTHENTICATION INFORMATION FOR USER AUTHENTICATION

(75) Inventors: Itaru Nakagawa, Kawasaki (JP); Kazuo Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 728 days.

(21) Appl. No.: 12/728,420

(22) Filed: Mar. 22, 2010

(65) Prior Publication Data

US 2010/0257595 A1 Oct. 7, 2010

(30) Foreign Application Priority Data

Apr. 1, 2009 (JP) ................. 2009-088745

(51) Int. Cl.
*H04L 29/06* (2006.01)
*H04L 9/32* (2006.01)
*G06F 21/55* (2013.01)
*G06F 21/33* (2013.01)

(52) U.S. Cl.
CPC .............. *H04L 9/3271* (2013.01); *H04L 9/321* (2013.01); *G06F 21/556* (2013.01); *H04L 63/08* (2013.01); *G06F 21/33* (2013.01)
USPC ........................................................... 726/6

(58) Field of Classification Search
CPC ................................ H04L 63/08; H04L 63/10
See application file for complete search history.

(56) References Cited

U.S. PATENT DOCUMENTS

2007/0044146 A1* 2/2007 Murase et al. ................. 726/10
2009/0235345 A1* 9/2009 Oikawa et al. .................. 726/7

FOREIGN PATENT DOCUMENTS

JP 2002-328904 11/2002
JP 2003-140765 5/2003

OTHER PUBLICATIONS

Notification of Reasons for Refusal dated Apr. 23, 2013, from corresponding Japanese Application No. 2009-088745.

* cited by examiner

*Primary Examiner* — Jeffrey Pwu
*Assistant Examiner* — Carlos Amorin
(74) *Attorney, Agent, or Firm* — Katten Muchin Rosenman LLP (57) ABSTRACT

An authentication information management program of an authentication information management apparatus allowing the authentication information management apparatus to execute: changing the first authentication information in correspondence information which is information including the first authentication information and second authentication information in association with each other and stored in a storage section of the authentication information management apparatus; transmitting the authentication apparatus of the changed first authentication information; determining, in response to a request from the apparatus to be authenticated, whether the second authentication information in the authentication request coincides with the second authentication information in the correspondence information; and returning, in the case where it is determined that the second authentication information in the authentication request coincides with the second authentication information in the correspondence information, the first authentication information associated with the second authentication information read from the storage section.

7 Claims, 9 Drawing Sheets

| APPLICATION | FIRST AUTHENTICATION INFORMATION | | SECOND AUTHENTICATION INFORMATION | |
|---|---|---|---|---|
| | ID | AUTHENTICATION KEY | ID | AUTHENTICATION KEY |
| APPLICATION 1 | 11 | CD34$% | 21 | FINGERPRINT INFORMATION 21 |
| APPLICATION 2 | 12 | 5678 | 22 | FINGERPRINT INFORMATION 22 |
| ... | ... | ... | ... | ... |

FIG. 5

| APPLICATION | POLICY | | |
|---|---|---|---|
| | CHANGE TIMING | AUTHENTICATION KEY GENERATION CONDITION | |
| | | AUTHENTICATION METHOD | GENERATION CONDITION |
| APPLICATION 1 | CHANGE AT EVERY LOGIN: YES<br><br>CHANGE AT PERIODIC INTERVALS: YES<br><br>CHANGE AT SECOND AUTHENTICATION: YES<br><br>CHANGE "IN-USE":NO | PASSWORD AUTHENTICATION | CHARACTER TYPE: ALPHABET AND NUMBER<br><br>CHARACTER APPEARANCE FREQUENCY:TWO TIMES OR LESS<br><br>PASSWORD LENGTH:6-32 CHARACTERS<br><br>DESIRED DIFFERER FROM PREVIOUS PASSWORD: THREE OR MORE CHARACTERS ARE MADE DIFFERENT |
| APPLICATION 2 | CHANGE AT EVERY LOGIN: NO<br><br>CHANGE AT PERIODIC INTERVALS: YES (EVERY DAY)<br><br>CHANGE AT SECOND AUTHENTICATION: NO<br><br>CHANGE "IN-USE":YES | NUMERIC AUTHENTICATION | CHARACTER TYPE: NUMERIC CHARACTER<br><br>PASSWORD LENGTH: 4 DIGITS<br><br>DESIRED DIFFERER FROM PREVIOUS PASSWORD: TWO OR MORE DIGITS ARE MADE DIFFERENT |
| ... | ... | ... | ... |

FIG. 6

| SECOND AUTHENTICATION ID | APPLICATION | USE STATE | USAGE SOURCE TERMINAL |
|---|---|---|---|
| ID21 | APPLICATION 1 | IN-USE | CLIENT TERMINAL A |
| | APPLICATION 2 | UNUSED | — |
| ID22 | APPLICATION 1 | UNUSED | — |
| | APPLICATION 2 | IN-USE | CLIENT TERMINAL B |
| ... | ... | ... | ... |

AUTHENTICATION INFORMATION MANAGEMENT OF ASSOCIATED FIRST AND SECOND AUTHENTICATION INFORMATION FOR USER AUTHENTICATION

CROSS-REFERENCE TO RELATED APPLICATIONS

This application is based upon and claims the benefit of priority of the prior Japanese Patent Application No. 2009-088745, filed on Apr. 1, 2009, the entire contents of which are incorporated herein by reference.

FIELD

The embodiments discussed herein are relates to a user authentication technique.

BACKGROUND

User authentication technique is used for protecting applications. In the case where a user authentication teqnique (e.g., password authentication) that has been introduced for an application is changed to a more robust authentication technique (e.g., biometric authentication), the application itself protected by the user authentication technique needs to be changed.

In order to cope with the above problem, there has been proposed an authentication technique using a plurality of authentication methods. For example, there is known a technique that manages user authentication information that a user uses for authentication, terminal authentication information that a user terminal uses for authentication, and a login script to an ASP (Application Service Provider) (refer to, e.g., Japanese Laid-open Patent Publication No. 2002-328904). In this authentication technique, only when user authentication has been successfully completed, the login script to the ASP is sent to the user terminal, and the user terminal acts as the user to execute authentication to the ASP using the terminal authentication information. In this authentication technique, the two pieces of information (user authentication information and terminal authentication information) are managed in association with each other by a management server.

However, in the technique disclosed in Japanese Laid-open Patent Publication No. 2002-328904, if the terminal authentication information is leaked, a system is in a vulnerable state until a system administrator or a user changes the terminal authentication information.

SUMMARY

A computer-readable recording medium that records, in a computer readable manner, an authentication information management program for an authentication information management apparatus that can be connected to an authentication apparatus that executes an authentication based on first authentication information and an apparatus to be authenticated based on the first authentication information, allowing the authentication information management apparatus to execute: changing the first authentication information in correspondence information which is information including the first authentication information and second authentication information different from the first authentication information in association with each other and stored in a storage section of the authentication information management apparatus; transmitting the authentication apparatus of the changed first authentication information; determining, in response to a request for execution of an authentication based on the second authentication information which is issued from the apparatus to be authenticated, whether the second authentication information in the authentication request coincides with the second authentication information in the correspondence information; and returning, in the case where it is determined that the second authentication information in the authentication request coincides with the second authentication information in the correspondence information, the first authentication information associated with the second authentication information read from the storage section as a reply to the request for the execution of the first authentication which is issued from the apparatus to be authenticated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment of the present invention will be described below with reference to the accompanying drawings.

Figure 1:
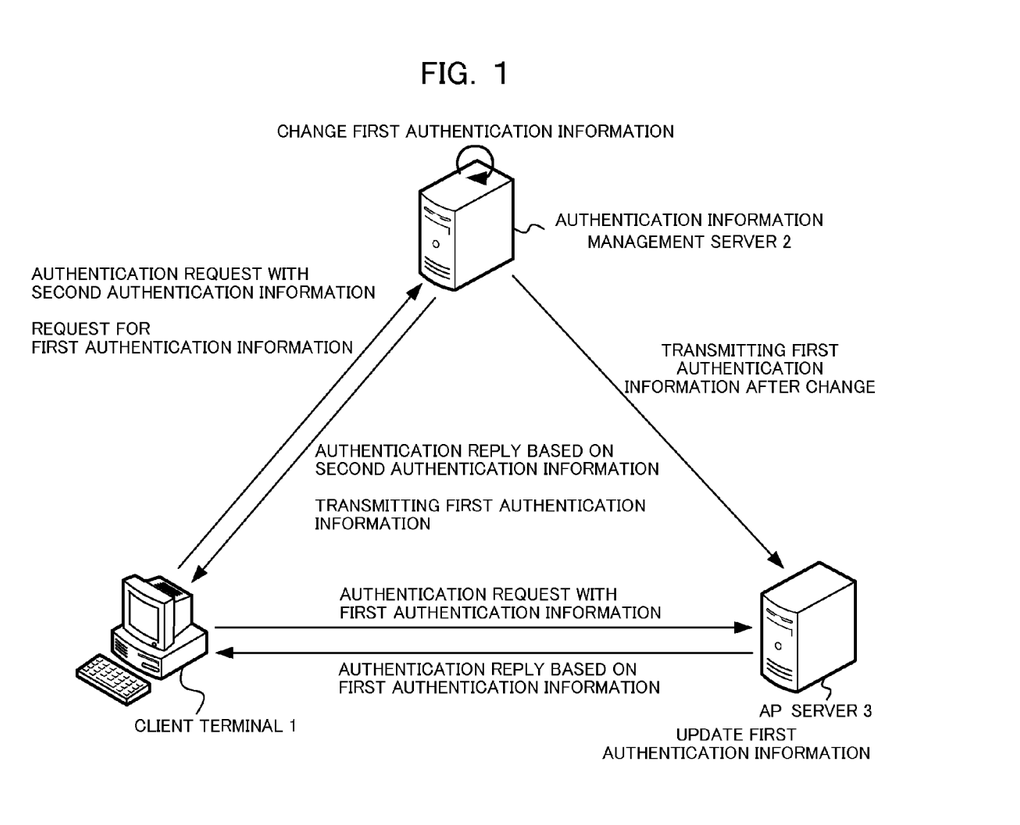
FIG. 1 is a view illustrating the entire configuration of an authentication system according to an embodiment of the present invention.

First, the entire configuration of an authentication system according to the present embodiment will be described. FIG. 1 is a view illustrating the entire configuration of an authentication system according to the present embodiment.

As illustrated in FIG. 1, an authentication system according to the present embodiment includes a client terminal 1 (apparatus to be authenticated), an authentication information management server 2, and an AP (Application) server 3 (authentication server), which are connected to one another through a network. The AP server 3 provides an application having an authentication function to the client terminal 1. The client terminal 1 uses the application provided by the AP server 3 through a login process. The authentication information management server 2 manages authentication information relating to the login process of the client terminal 1.

In the authentication system of the present embodiment, the login process of the client terminal 1 to the application is accomplished through a first authentication for the application and a second authentication for the authentication information management server 2. The first authentication is an application-specific authentication, so that its authentication method depends on the application. In the case of the second authentication, its authentication method does not depend on the application; therefore an authentication method according to desired authentication strength can be selected. Hereinafter, authentication information relating to the first authentication is referred to as "first authentication information", and authentication information relating to the second authentication is referred to as "second authentication information". Further, in the present embodiment, the authentication information includes a set of an ID and an authentication key.

Figure 2:
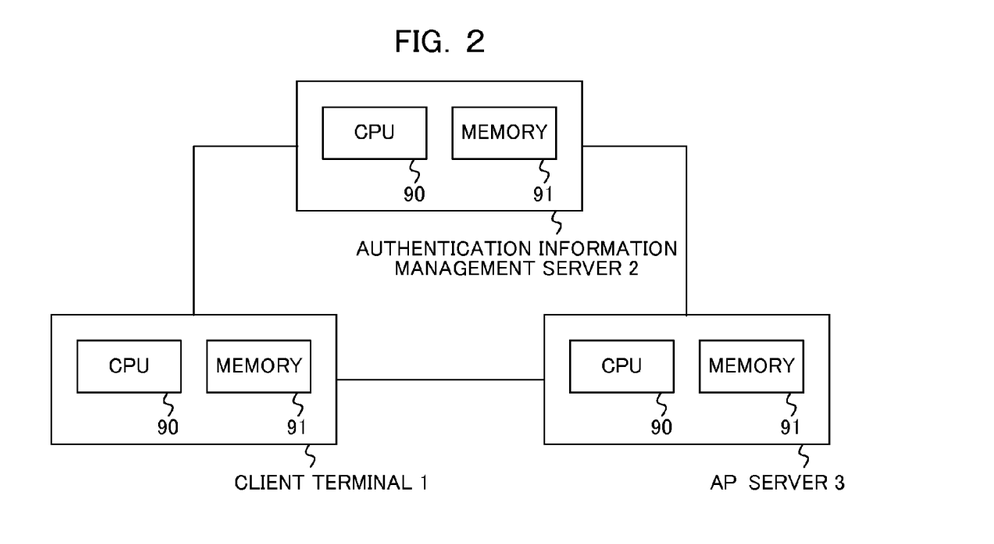
FIG. 2 is a view illustrating a hardware configuration of the authentication system of the present embodiment.
Figure 3:
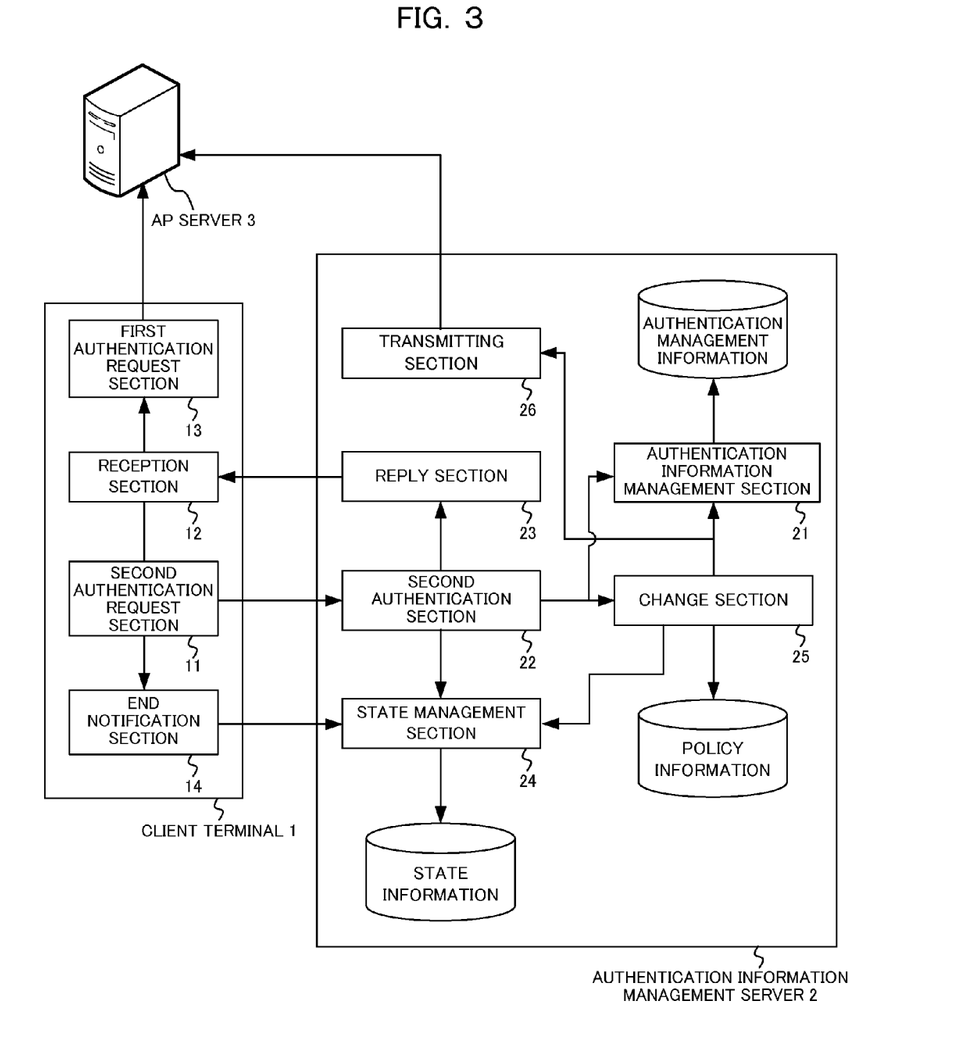
FIG. 3 is a view illustrating functional configurations of a client terminal and an authentication information management server.

Next, a hardware configuration and a functional configuration of the authentication system of the present embodiment will be described. FIG. 2 is a view illustrating a hardware configuration of the authentication system of the present embodiment. FIG. 3 is a view illustrating functional configurations of the client terminal and authentication information management server.

As illustrated in FIG. 2, the client terminal 1, authentication information management server 2, and AP server 3 in the authentication system of the present embodiment each have a CPU (Central Processing Unit) 90 and a memory 91. Further, software for the authentication of the present embodiment is installed in the client terminal 1. As illustrated in FIG. 3, the installed software allows the client terminal 1 to function as a second authentication request section 11, a reception section 12, a first authentication request section 13, and an end notification section 14. The authentication information management server 2 has as its functions an authentication information management section 21 (management section), a second authentication section 22 (authentication section), a reply section 23, a state management section 24, a change section 25, and a transmitting section 26. The functional sections described above are achieved by the CPUs 90 provided in the client terminal 1 and the authentication information management server 2.

The second authentication request section 11 of the client terminal 1 requests the authentication information management server 2 to execute the second authentication based on the second authentication information and, after completion of the authentication, requests the authentication information management server 2 to transmit thereto the first authentication information. The reception section 12 receives, from the authentication information management server 2, a reply to the request made from the second authentication request section 11 and first authentication information. The first authentication request section 13 requests the AP server 3 to execute the first authentication based on the first authentication information. The end notification section 14 notifies the authentication information management server 2 of application logout in client terminal 1 as an end notification.

The authentication information management section 21 of the authentication information management server 2 associates applications (application 1 and application 2) provided by the AP server 3, first authentication information, and second authentication information with one another to manage them as authentication management information (correspondence information). The second authentication section 22 executes the second authentication based on the second authentication information and receives the request for transmission of the first authentication information from the client terminal 1. The reply section 23 transmits, to the client terminal 1, a reply to the request for execution of the second authentication received by the second authentication section 22 and the first authentication information as a reply to the request for transmission of the first authentication information. The state management section 24 manages an application usage state of the client terminal 1 as state information. The change section 25 changes the first authentication information at the timing based on policy information indicating a predetermined condition. The transmitting section 26 transmits the first authentication information changed by the change section 25 to the AP server 3 for updating first authentication information of terminal 1.

Figure 4:
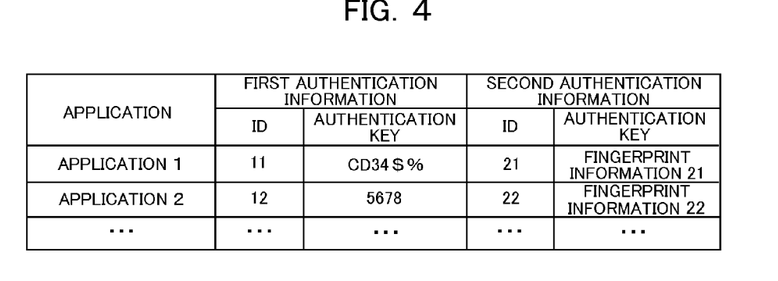
FIG. 4 is a view illustrating authentication management information.

Next, the authentication management information will be described. FIG. 4 is a view illustrating the authentication management information.

As illustrated in FIG. 4, the authentication management information includes an application, first authentication information, and second authentication information in association with one another. The first authentication information and second authentication information each include an ID which is an identifier uniquely identifying a specific user and an authentication key in association with each other. In the authentication management information illustrated in FIG. 4.

Figure 5:
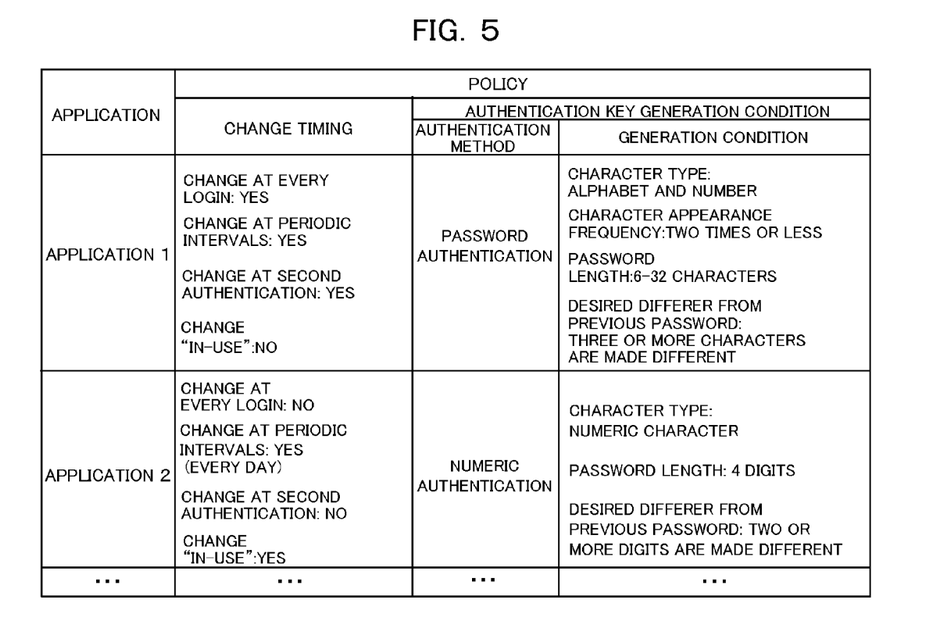
FIG. 5 is a view illustrating policy information.

Next, the policy information will be described. FIG. 5 is a view illustrating the policy information.

As illustrated in FIG. 5, the policy information includes an application and a policy in association with each other. The policy includes a change timing and an authentication key generation condition in association with each other. The authentication key generation condition includes an authentication method and a generation condition in association with each other. The change timing is a condition for changing the first authentication information. The change timing condition includes whether to allow a change to be made "change at every login", "change at periodic intervals", and "change at second authentication", whether to allow a change to be made in-use, and the like. These conditions are examples and other conditions may be set. In the case where the first authentication information is changed "change at periodic intervals", the associated authentication key is changed in periodic. The authentication method is an authentication system of the associated application. The generation condition is a condition for generating the authentication key corresponding to the associated application.

Figure 6:
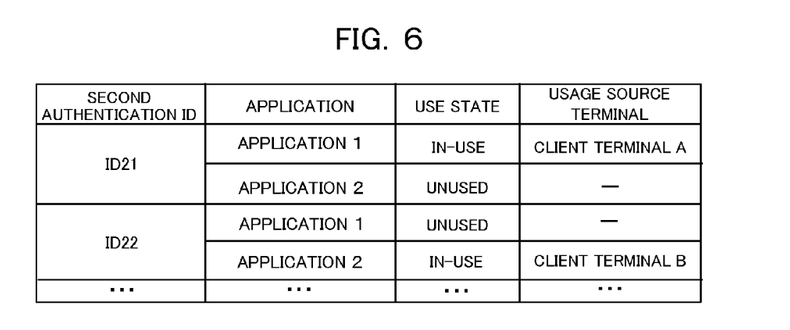
FIG. 6 is a view illustrating state information.

Next, the state information will be described. FIG. 6 is a view illustrating the state information.

As illustrated in FIG. 6, the state information includes an ID of the second authentication information, an application, a use state of the application, and a terminal using the application in association with one another. The use state is represented by "in-use" indicating a state where the client terminal is logging in the application or "unused" indicating a state where the client terminal is not logging in the application. In the case where the use state is "in-use", the client terminal that is logging in the application as a usage source terminal is associated with the second authentication ID and application. Although the use state includes both "in-use" and "unused" in FIG. 6, it may include only an application in-use as a management target. In this case, only a client terminal that utilizes the application to be managed is entered into the state information and, when this client terminal stops utilizing the application, the entry thereof is deleted from the state information.

Figure 7:
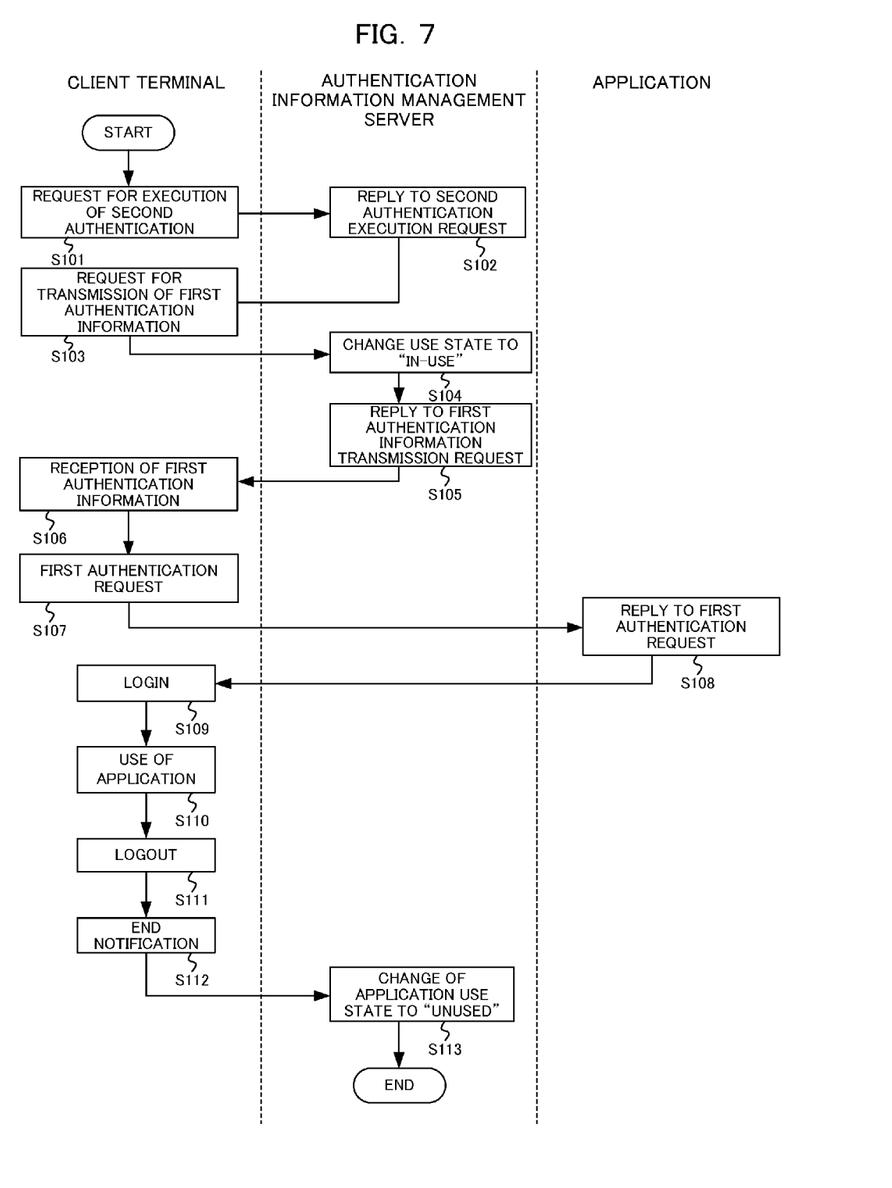
FIG. 7 is a sequence diagram illustrating operations of the authentication system concerning login and logout.

Next, operation of the authentication system concerning login and logout of the client terminal to/from the application will be described using a flowchart. FIG. 7 is a sequence diagram illustrating the operations of the authentication system concerning login and logout. It is assumed in FIG. 7 that the first and second authentication information are stored for management, as authentication information management information, in a storage (e.g., memory 91) by the authentication information management section.

The second authentication request section 11 of the client terminal 1 requests the authentication information management server 2 to execute the second authentication based on the second authentication information (S101).

The second authentication section 22 of the authentication information management server 2 executes the second authentication based on the second authentication information in the authentication information management information according to the request from the client terminal 1 and returns a reply to the client terminal 1 (S102). The second authentication is executed based on determination of whether the second authentication information in the second authentication execution request from the client terminal 1 coincides with the second authentication information in the authentication information management information.

After completion of the second authentication by the authentication information management server 2, the second authentication request section 11 of the client terminal 1 requests the authentication information management server 2 to transmit thereto the first authentication information (S103).

The second authentication section 22 of the authentication information management server 2 changes the application use state of the client terminal 1 to "in-use" through the state management section 24 (S104). After the change, the second authentication section 22 refers to the authentication management information illustrated in FIG. 4 and returns as a reply the first authentication information associated with the second authentication information based on which second authentication of the client terminal 1 has been executed (S105).

The reception section 12 of the client terminal 1 receives the first authentication information from the authentication information management server 2 (S106). The first authentication request section 13 detects an authentication screen of the application to be logged in and requests the application to execute the first authentication based on the first authentication information received by the reception section 12 (S107). The authentication screen is a screen for inputting the ID and a password serving as the authentication key. The first authentication request section 13 automatically inputs the ID and password for the first authentication.

The application performs the first authentication based on the first authentication information according to the request from the client terminal 1 and returns a reply to the client terminal 1 (S108). The first authentication is executed based on determination of whether the first authentication information used in the first authentication execution request from the client terminal 1 coincides with the first authentication information transmitted by the authentication information management server 2.

After returning the reply about completion of the first authentication by the application, the client terminal 1 logs in the application (S109) and uses the application (S110). When the client terminal 1 logs out from the application after usage (S111), the end notification section 14 transmits a end notification to the authentication information management server 2 (S112).

After the transmission of the end notification from the client terminal 1, the state management section 24 of the authentication information management server 2 changes the application use state of the client terminal 1 to "unused" (S113).

Figure 8:
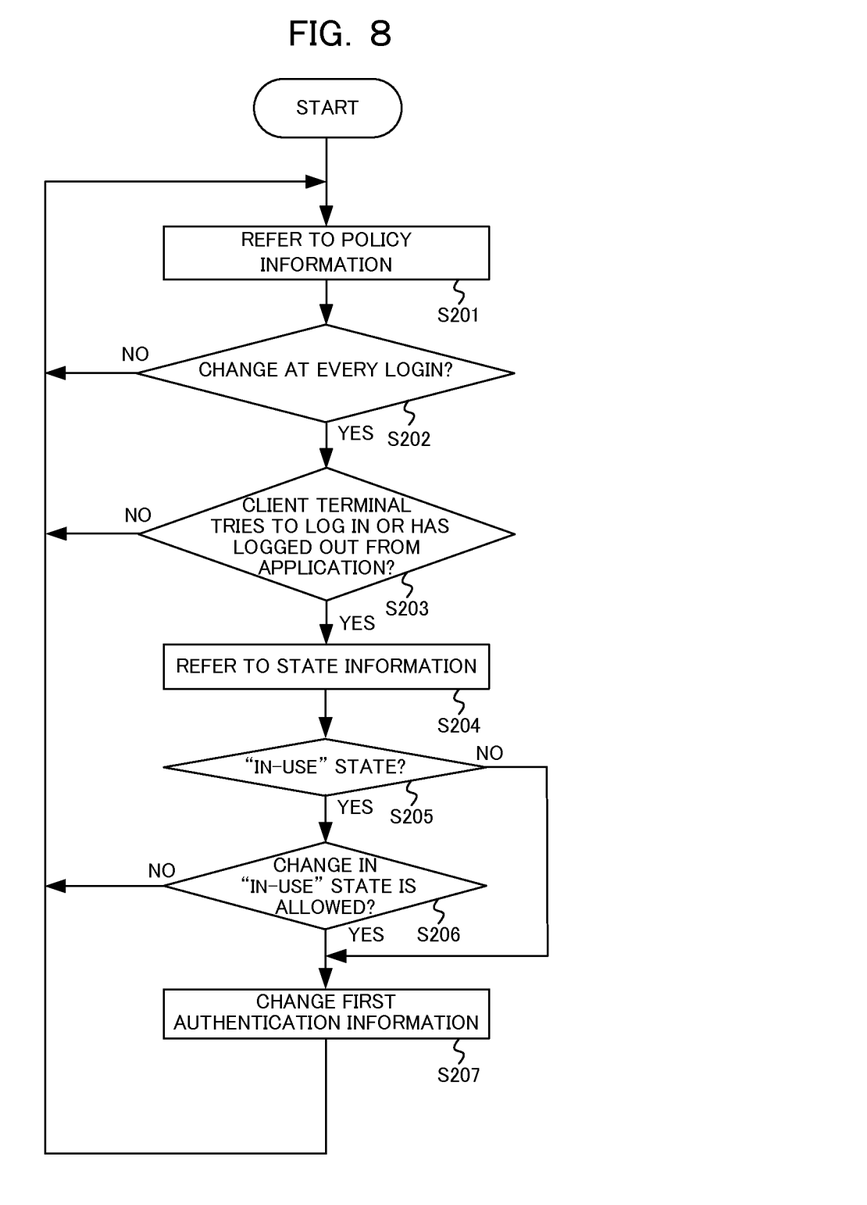
FIG. 8 is a flowchart illustrating operations of change processing performed in the case where the change timing is "change at every login"

Next, operation of change processing performed by the change section will be described for each change timing. First, the change processing performed in the case where the change timing is "change at every login" will be described. FIG. 8 is a flowchart illustrating operations of the change processing.

The change section 25 refers to the policy information (S201) and determines whether the change timing is "change at every login" (S202).

In the case where the change timing is "change at every login" (YES in S202), the change section 25 determines whether the client terminal 1 tries to log in the application or has logged out from the application (S203). The determination of whether the client terminal 1 tries to log in or has logged out from the application is made based on whether the first authentication information has been requested by the client terminal 1.

In the case where the client terminal 1 has logged in the application (YES in S203), the change section 25 refers to the state information (S204) through the state management section 24 and determines whether the client terminal 1 is using an application which has been associated with the first authentication information to be changed in the authentication management information (S205).

In the case where the client terminal 1 is using the application (YES in S205), the change section 25 determines whether a change of the first authentication information that is being used is allowed (S206).

In the case where the change of the first authentication information that is being used is allowed (YES in S206), the change section 25 changes the first authentication information in the authentication management information through the authentication information management section 21 (S207) and refers to the policy information once again for next request (S201).

On the other hand, in the case where the change of the first authentication information that is being used is not allowed (NO in S206), the change section 25 refers to the policy information once again for next request (S201).

In the case where the client terminal 1 is not using the application (NO in S205), the change section 25 changes the first authentication information in the authentication management information through the authentication information management section 21 (S207).

In the case where the client terminal 1 has not logged in the application (NO in S203), the change section 25 refers to the policy information once again for next request (S201).

In the case where the change timing is not "change at every login" (NO in S202), the change section 25 refers to the policy information once again for next request (S201).

Figure 9:
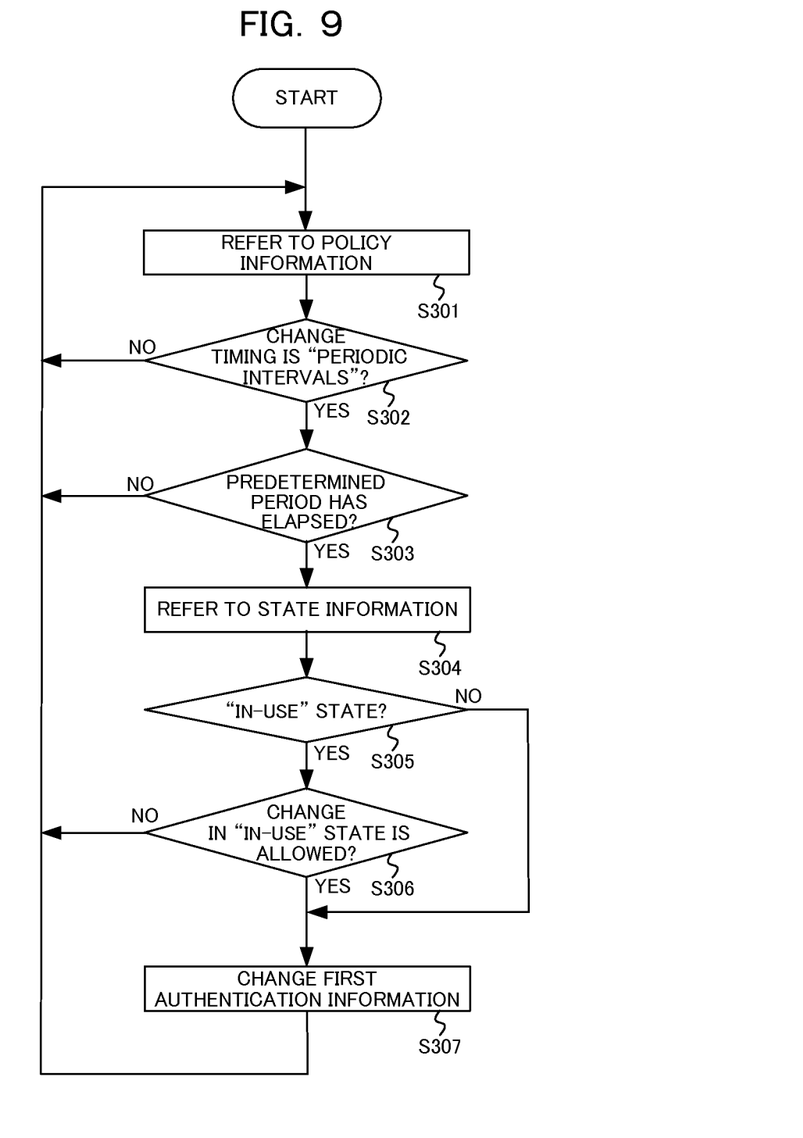
FIG. 9 is a flowchart illustrating operations of the change processing performed in the case where the change timing is "periodic intervals"

Next, operation of the change processing performed in the case where the change timing is "periodic intervals" will be described. FIG. 9 is a flowchart illustrating operations of the change processing performed in the case where the change timing is "periodic intervals".

The change section 25 refers to the policy information (S301) and determines whether the change timing is "periodic intervals" (S302).

In the case where the change timing is "periodic intervals" (YES in S302), the change section 25 determines whether a predetermined period has elapsed based on, e.g., the date of a previous change (S303).

In the case where the predetermined period has elapsed (YES in S303), the change section 25 refers to the state information through the state management section 24 (S304) and determines whether the client terminal 1 is using an application which has been associated with the first authentication information to be changed in the authentication management information (S305).

In the case where the client terminal 1 is using the application (YES in S305), the change section 25 determines whether a change of the first authentication information that is being used is allowed (S306).

In the case where the change of the first authentication information that is being used is allowed (YES in S306), the change section 25 changes the first authentication information in the authentication management information through the authentication information management section 21 (S307) and refers to the policy information once again for next request (S301).

On the other hand, in the case where the change of the first authentication information that is being used is not allowed (NO in S306), the change section 25 refers to the policy information once again for next request (S301).

In the case where the client terminal 1 is not using the application (NO in S305), the change section 25 changes the first authentication information in the authentication management information through the authentication information management section 21 (S307).

In the case where the predetermined period has not elapsed (NO in S303), the change section 25 refers to the policy information once again for next request (S301).

In the case where the change timing is not "periodic intervals" (NO in S302), the change section 25 refers to the policy information once again for next request (S301).

Figure 10:
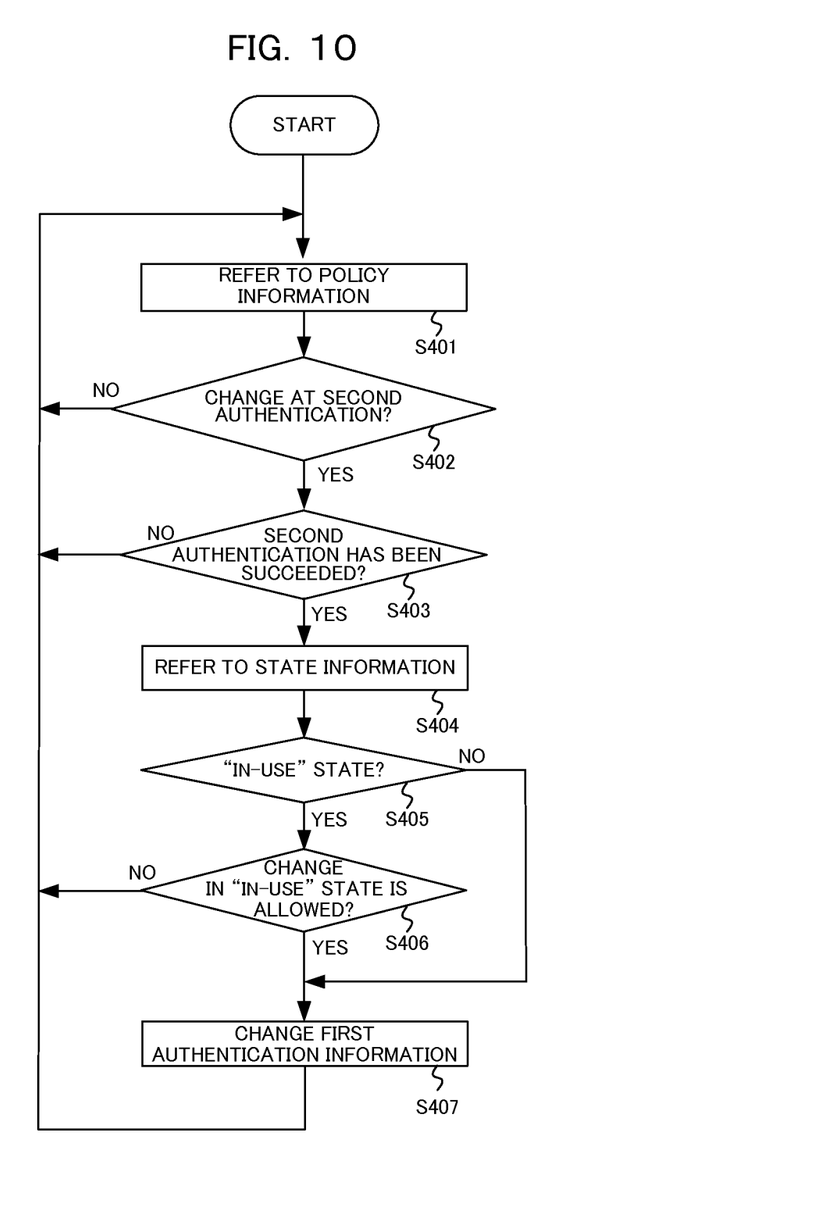
FIG. 10 is a flowchart illustrating operations of the change processing performed in the case where the change timing is "change at second authentication"

Next, operation of the change processing performed in the case where the change timing is "change at second authentication" will be described. FIG. 10 is a flowchart illustrating operations of the change processing performed in the case where the change timing is "change at second authentication".

The change section 25 refers to the policy information (S401) and determines whether the change timing is "change at second authentication" (S402).

In the case where the change timing is "change at second authentication" (YES in S402), the change section 25 determines whether a second authentication of the client terminal 1 has been succeeded (S403).

In the case where the second authentication of the client terminal 1 has been succeeded (YES in S403), the change section 25 refers to the state information through the state management section 24 (S404) and determines whether the client terminal 1 is using an application which has been associated with the first authentication information to be changed in the authentication management information (S405).

In the case where the client terminal 1 is using the application (YES in S405), the change section 25 determines whether a change of the first authentication information that is being used is allowed (S406).

In the case where the change of the first authentication information that is being used is allowed (YES in S406), the change section 25 changes the first authentication information in the authentication management information through the authentication information management section 21 (S407) and refers to the policy information once again (S401).

On the other hand, in the case where the change of the first authentication information that is being used is not allowed (NO in S406), the change section 25 refers to the policy information once again (S401).

In the case where the client terminal 1 is not using the application (NO in S405), the change section 25 changes the first authentication information in the authentication management information through the authentication information management section 21 (S407).

In the case where the second authentication of the client terminal 1 has not been succeeded (NO in S403), the change section 25 refers to the policy information once again (S401).

In the case where the change timing is not "change at second authentication" (NO in S402), the change section 25 refers to the policy information once again (S401).

Figure 11:
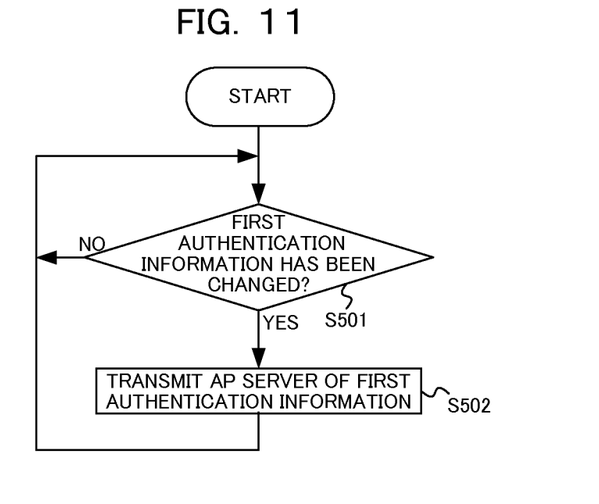
FIG. 11 is a flowchart illustrating operations of transmitting processing.

Next, operation of transmitting processing performed by the transmitting section will be described. FIG. 11 is a flowchart illustrating operations of the transmitting processing.

The transmitting section 26 determines whether the first authentication information in the authentication management information has been changed (S501).

In the case where the first authentication information has been changed (YES in S501), the transmitting section 26 transmits an application with which the first authentication information before change has been associated of the first authentication information after change (S502). After the transmitting has been made, the transmitting section 26 determines once again whether the first authentication information in the authentication management information has been changed (S501).

Figure 12:
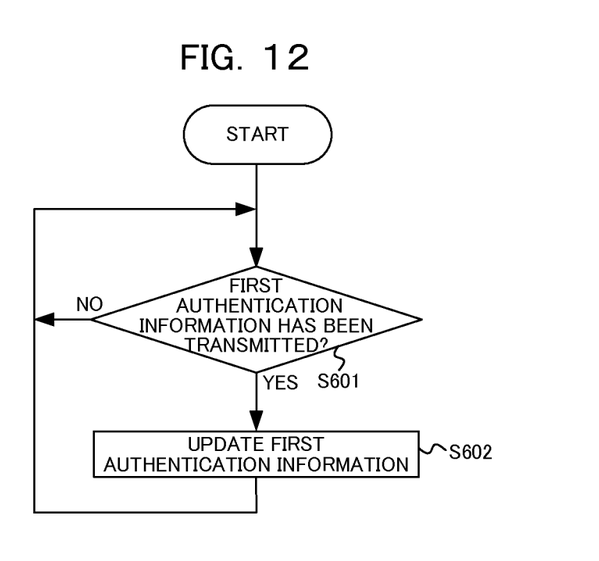
FIG. 12 is a flowchart illustrating operations of the AP server.

Next, operation of the AP server concerning the change of the first authentication information will be described. FIG. 12 is a flowchart illustrating the operations of the AP server.

The AP server 3 determines whether the first authentication information has been transmitted from the authentication information management server 2 (S601).

In the case where the first authentication information has been transmitted from the authentication information management server 2 (YES in S601), the AP server 3 updates the first authentication information (S602) and determines once again whether the first authentication information has been transmitted from the authentication information management server 2 (S601).

On the other hand, in the case where the first authentication information has not been transmitted from the authentication information management server 2 (NO in S601), the AP server 3 determines once again whether the first authentication information has been transmitted from the authentication information management server 2 (S601).

As described above, actively changing the first authentication information allows quick action against a leakage of the first authentication information. Further, the authentication method of the second authentication is not dependent on the application, so that the strength of authentication can be increased by employing, e.g., biometrics as the method employed in the second authentication.

Further, freely setting a condition for changing the first authentication information allows a flexible response to the application function or situation in which a user utilizes the application. Further, by changing the first authentication information under a condition according to a situation in which the client terminal 1 utilizes the application, it is possible to prevent an abnormality of the application due to the change of the first authentication information. Such an abnormality can occur in, e.g., an application that uses the first authentication information once again during login state. In this case, making a setting so as not to change the first authentication information during use of the application prevents the abnormality of the application.

Figure 13:
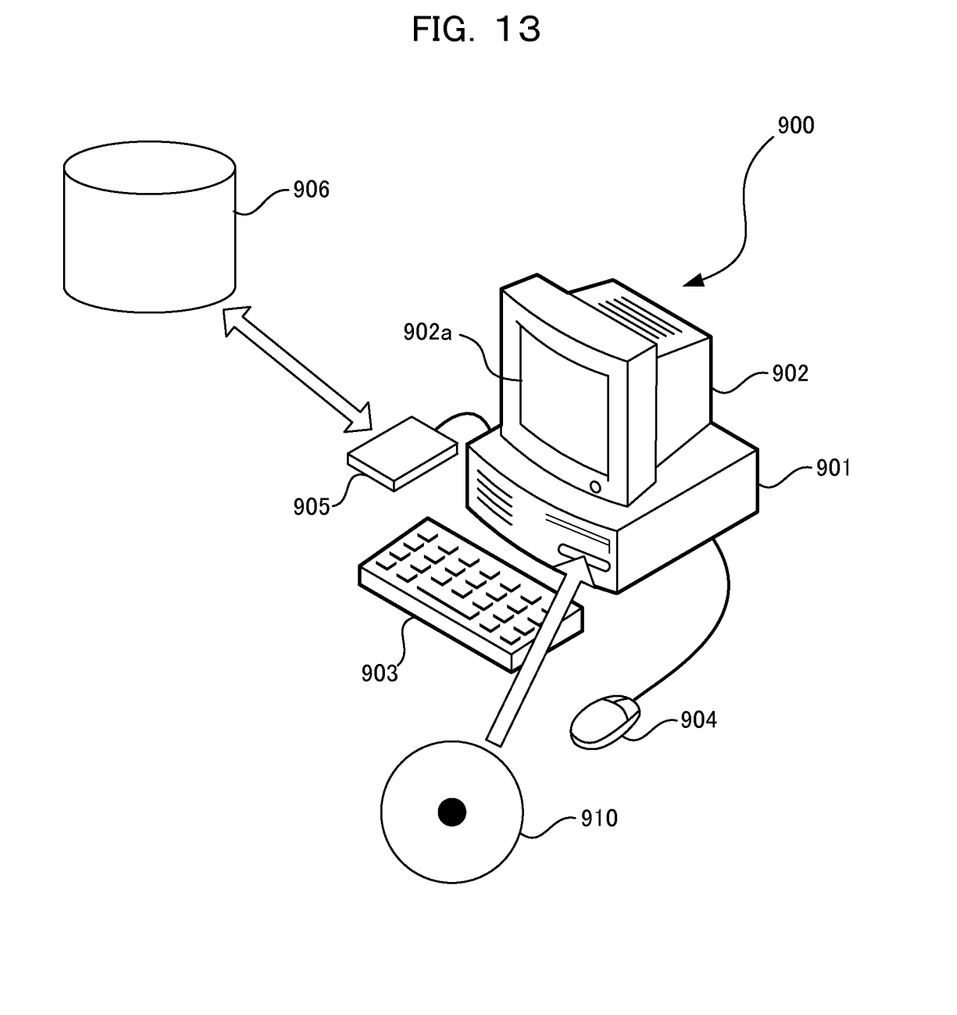
FIG. 13 is a view illustrating an example of a computer system to which the present invention is applied.

The present invention may be applied to a computer system as described below. FIG. 13 is a view illustrating an example of a computer system to which the present invention is applied. A computer system 900 illustrated in FIG. 13 includes a main body 901 incorporating a CPU, a disk drive, and the like, a display 902 that displays an image according to an instruction from the main body 901, a keyboard 903 for a user to input various pieces of information in the computer system 900, a mouse 904 for a user to specify a given position on a display screen 902a of the display 902, and a communication unit 905 that accesses an external database or the like to download, e.g., a program stored in another computer system. As the communication unit 905, a network communication card, a modem, and the like may be employed.

It is possible to provide as an authentication information management program a program that allows a computer to execute the above steps in a computer system constituting the authentication information management apparatus. By storing the above program in a storage medium that can be read by the computer system, it is possible to allow the computer system constituting the authentication information management apparatus to execute the program. The program executing the above steps is stored in a portable recording medium such as a disk 910 or downloaded from a recording medium 906 of another computer system by the communication unit 905. An authentication information management program (authentication information management software) allowing the computer system 900 to exert at least an authentication information management function is input to the computer system 900 and is compiled therein. The compiled program allows the computer system 900 to operate as an authentication information management apparatus having the authentication information management function. The program may be stored in a computer-readable storage medium such as a disk 910. The recording medium that can be read by the computer system 900 mentioned here includes: an internal storage device mounted in a computer, such as HDD, ROM or RAM, a portable storage medium such as the disk 910, a flexible disk, a DVD disk, a magneto-optical disk, or an IC card; a database that holds computer program; another computer system and database thereof; and various recording media that can be accessed from a computer system connected thereto through a communication means such as the communication unit 905.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable recording medium storing an authentication information management program, the program allowing a computer to execute:

changing first authentication information in correspondence information which is information including the first authentication information and second authentication information different from the first authentication information in association with each other and stored in a storage section of the authentication information management apparatus;

transmitting the changed first authentication information to an authentication apparatus that executes an authentication based on the first authentication information of the changed first authentication information, the authentication apparatus being connected to the computer;

determining, in response to a request for execution of an authentication based on the second authentication information which is issued from an apparatus to be authenticated based on the first authentication information, whether the second authentication information in the authentication request coincides with the second authentication information in the correspondence information, the apparatus to be authenticated being connected to the computer; and returning, when it is determined by the determining that the second authentication information in the authentication request coincides with the second authentication information in the correspondence information, the first authentication information associated with the second authentication information read from the storage section as a reply to the request for the execution of the first authentication which is issued from the apparatus to be authenticated, wherein the first authentication information is changed based on a prescribed condition that is associated with the authentication apparatus, the authentication apparatus determines, in response to a request from the apparatus to be authenticated for execution of an authentication based on the first authentication information returned as the reply, whether the first authentifation information in the authentication request coincides with the first authentication information transmitted in the transmitted, and the prescribed condition is settable and is selected from a determination result for the request for execution of an authentication based on the second authentication information or a determination result by the authentication apparatus.

2. The computer-readable recording medium according to claim 1, wherein the first authentication information is changed to authentication information according to a same authentication method as that of before the changing.

3. The computer-readable recording medium according to claim 1, wherein the second authentication information is authentication information according to a different authentication method from that of the first authentication information.

4. An authentication information management apparatus comprising:

a change section that changes first authentication information in correspondence information which is information including the first authentication information and second authentication information different from the first authentication information in association with each other and stored in a storage section of the authentication information management apparatus;

a transmitting section that transmits the changed first authentication information to an authentication apparatus that executes an authentication based on the first authentication information of the first authentication information changed by the change section, the authentication apparatus being connected to the authentication information management apparatus;

an authentication section that determines, in response to a request for execution of an authentication based on the second authentication information which is issued from the apparatus to be authenticated based on the first authentication information, whether the second authentication information in the authentication request coincides with the second authentication information in the correspondence information, the apparatus to be authenticated being connected to the authentication information management apparatus; and a reply section that returns, in the case where it is determined by the authentication section that the second authentication information in the authentication request coincides with the second authentication information in the correspondence information, the first authentication information associated with the second authentication information read from the storage section as a reply to the request for the execution of the first authentication which is issued from the apparatus to be authenticated, wherein the first authentication information is changed based on a prescribed condition that is associated with the authentication apparatus, the authentication apparatus determines, in response to a request from the apparatus to be authenticated for execution of an authentication based on the first authentication information returned from the reply section as the reply, whether the first authentication information in the authentication request coincides with the first authentication information transmitted from the transmission section, and the prescribed condition is settable and is selected from a determination result for the request for execution of an authentication based on the second authentication information or a determination result by the authentication apparatus.

5. An authentication method of an authentication system having an authentication apparatus, an authentication information management apparatus, and an apparatus to be authenticated, wherein the authentication information management apparatus associates first authentication information and second authentication information different from the first authentication information with each other and stores the first and second authentication information in a storage section of the authentication information management apparatus as correspondence information, the authentication information management apparatus;

the authentication information management apparatus changes the first authentication information in correspondence information based on a prescribed condition that is associated with the authentication apparatus;

the authentication information management apparatus transmitting the authentication apparatus of the changed first authentication information;

the authentication apparatus updates, to the transmitted first authentication information, the first authentication information based on which an authentication of the apparatus to be authenticated is executed;

the apparatus to be authenticated requests the authentication information management apparatus to execute an authentication based on the second authentication information;

the authentication information management apparatus determines, in response to a request for execution of an authentication based on the second authentication information, whether the second authentication information in the request coincides with the second authentication information in the correspondence information;

in the case where the authentication information management apparatus determines that the second authentication information in the authentication request coincides with the second authentication information in the correspondence information, the apparatus to be authenticated requests the authentication information management apparatus to transmit thereto the first authentication information;

the authentication information management apparatus transmits to the apparatus to be authenticated the first authentication information associated with the second authentication information read from the storage section as a reply to the request for transmitting the first authentication information;

the apparatus to be authenticated receives the first authentication information and requests the authentication apparatus to execute an authentication based on the received first authentication information; and the authentication apparatus determines, in response to a request for execution of an authentication based on the first authentication information, whether the first authentication information in the request coincides with the first authentication information updated by the authentication apparatus, wherein the prescribed condition is settable and is selected from a determination result for the request for execution of an authentication based on the second authentication information or a determination result by the authentication apparatus.

6. A non-transitory computer-readable recording medium storing an authentication information management program of an authentication information management apparatus that is able to connect to an authentication apparatus, which executes authentication by first authentication information, and an apparatus to be authenticated, which is authenticated by the first authentication information, the program allowing the authentication information management apparatus to execute:

changing the first authentication information in correspondence information which is information including the first authentication information and second authentication information different from the first authentication information in association with each other and stored in a storage section of the authentication information management apparatus based on a prescribed condition that is associated with the authentication apparatus;

notifying the authentication apparatus of the changed first authentication information;

determining, in response to a request for execution of an authentication based on the second authentication information, which is issued from the apparatus to be authenticated, whether the second authentication information in the authentication request coincides with the second authentication information in the correspondence information; and returning, when it is determined by the determining that the second authentication information in the authentication request coincides with the second authentication information in the correspondence information, the changed first authentication information associated with the second authentication information read from the storage section as a reply to the authentication apparatus, wherein the prescribed condition is settled and is selected from a determination result for the request for execution of an authentication based on the second authentication information or a determination result by the authentication apparatus.

7. A method for managing authentication information of an authentication information management apparatus that can be connected to an authentication apparatus that executes an authentication based on first authentication information and an apparatus to be authenticated based on the first authentication information, comprising:
- changing the first authentication information in correspondence information which is information including the first authentication information and second authentication information different from the first authentication information in association with each other and stored in a storage section of the authentication information management apparatus based on a prescribed condition that is associated with the authentication apparatus;
- notifying the authentication apparatus of the changed first authentication information by the changing;
- determining, in response to a request for execution of an authentication based on the second authentication information which is issued from the apparatus to be authenticated, whether the second authentication information in the authentication request coincides with the second authentication information in the correspondence information; and
- returning, in the case where it is determined that the second authentication information in the authentication request coincides with the second authentication information in the correspondence information by the determining, the changed first authentication information associated with the second authentication information read from the storage section to the authentication apparatus as a reply, wherein
- the prescribed condition is settable and is selected from a determination result for the request for execution of an authentication based on the second authentication information or a determination result by the authentication apparatus.

* * * * *